Aug. 26, 1969
A. J. THAYER
3,462,931
FRUIT CATCHER
Filed Oct. 31, 1966
2 Sheets-Sheet 1
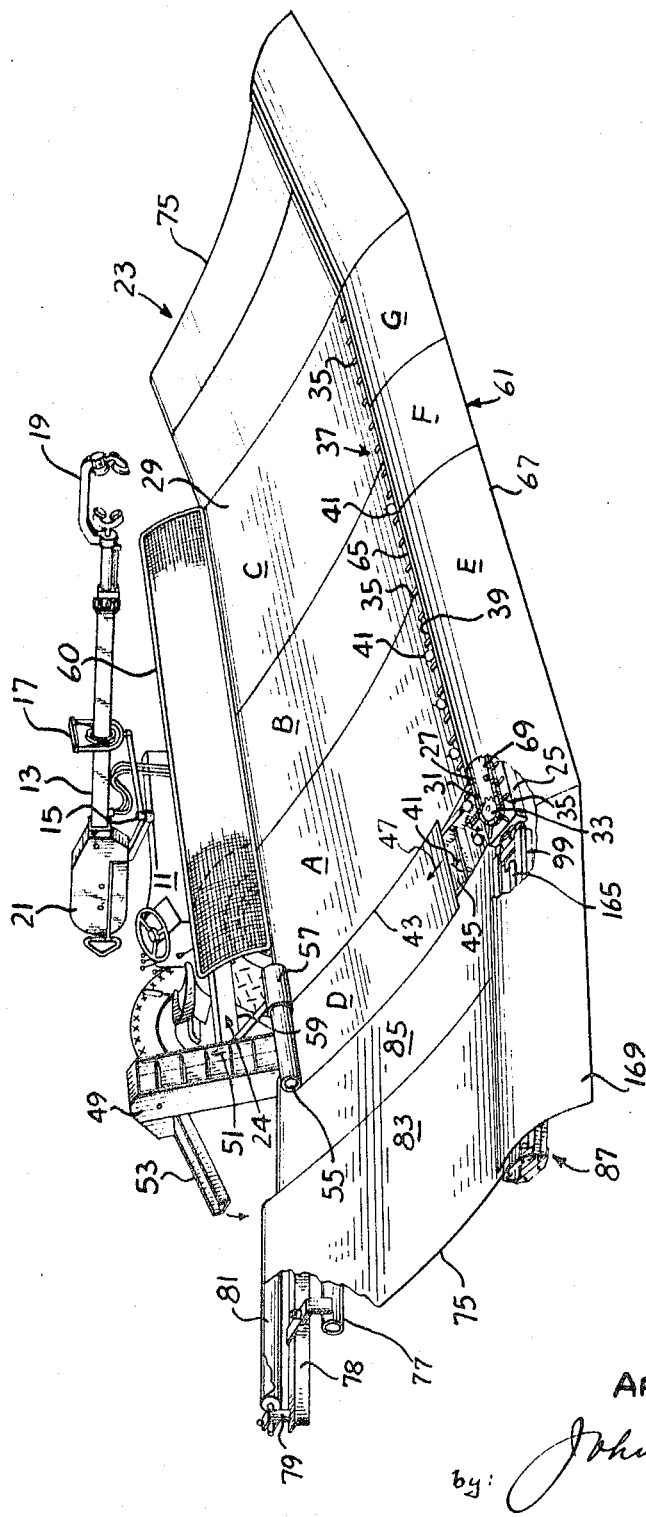
INVENTOR
ARLIE J. THAYER
by: John J. Kowalik
ATTY.

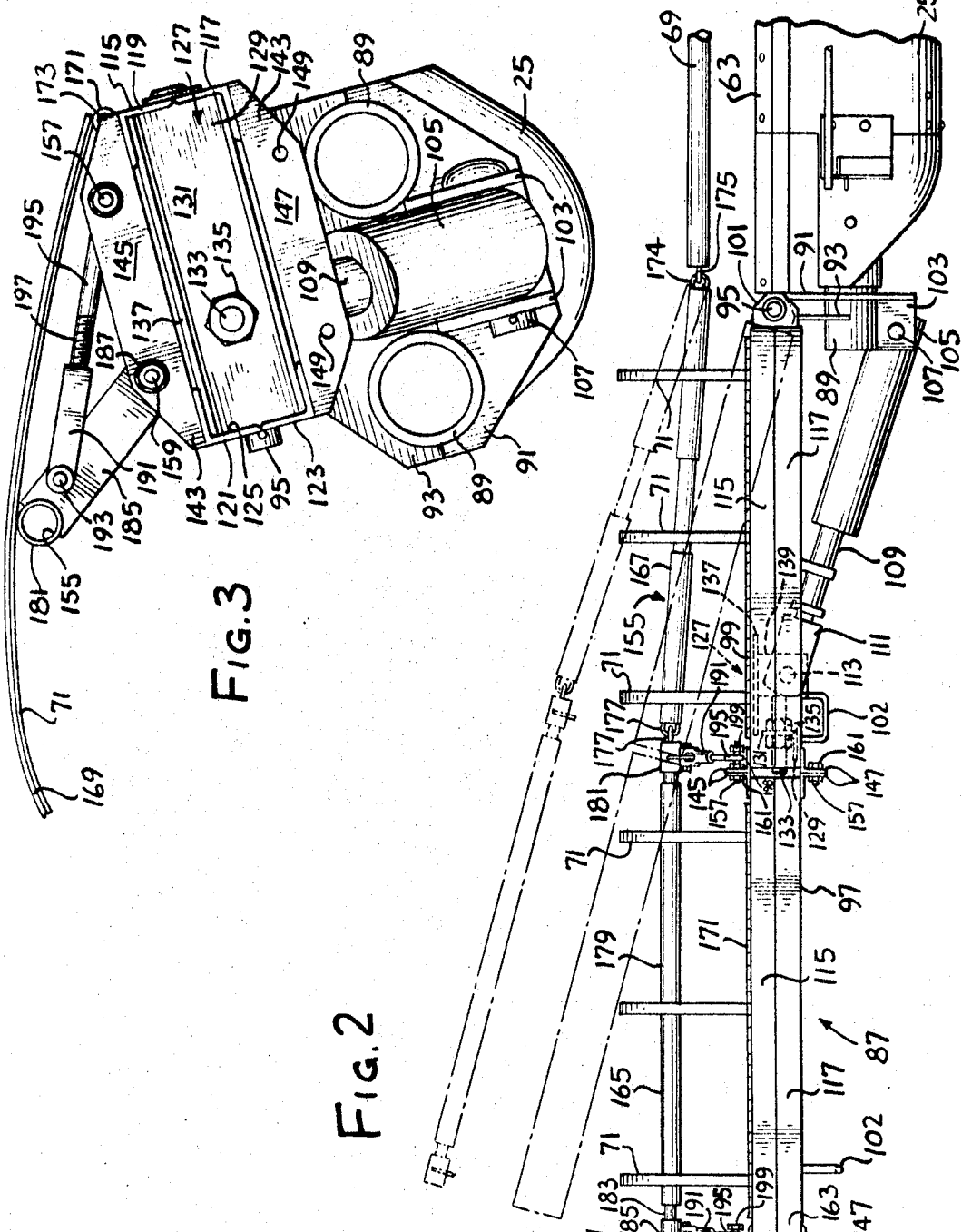

United States Patent Office 3,462,931
Patented Aug. 26, 1969

3,462,931
FRUIT CATCHER
Arlie J. Thayer, Brookfield, Ill., assignor to International Harvester Company, Chicago, Ill., a corporation of Delaware
Filed Oct. 31, 1966, Ser. No. 590,784
Int. Cl. A01g *19/06*
U.S. Cl. 56—329                    3 Claims

ABSTRACT OF THE DISCLOSURE

An extension for a fruit catcher apron in which there is provided in addition to a fruit catching web, a supplemental deflector, and an attitude control arm for supporting the extension and a tilt linkage for modifying the position of the arm by twisting the web extension for delivery to the apron.

---

This invention relates to fruit catchers and the like. Particularly the invention relates to apron assemblies of fruit catchers. Specifically the invention relates to an adapter or extension for a conventional apron assembly of a fruit catcher. Attention is directed to copending application Ser. No. 590,945 filed on Oct. 31, 1966 for Fruit Catcher.

Conventionally, a fruit catcher may comprise a self-powered vehicle for moving from station to station within an orchard. The vehicle serves as a carrier for a catcher apron assembly which includes a framework and thereby supported web means. They are arranged for extension from a side of the vehicle toward a tree for catching its crop as it is shaken free. The web means when conditioned for fruit catching slopes outwardly and downwardly to gravity feed caught fruit. A conveyor is mounted in fruit-receiving association with the web means along its outer edge. The conveyor carries thereto delivered fruit to an elevator and collection means by which the fruit is removed from the fruit catcher.

Customarily, a fruit catcher is manufactured so that the length of its conveyor is about equal to a calculated standard width of its web means. However, orchard conditions may be encountered in which wider than standard web means is desired. To solve this problem by prior means requires excessive equipment or results in harvesting loss or inefficiency as no construction directed to this problem has been provided heretofore.

In accordance with the present invention and as an object thereof an improved fruit catcher apron assembly is provided.

Another object of the invention is the provision of an apron extension assembly for an apron assembly of a conventional fruit catcher.

Because a fruit catcher conveyor of standard length has excessive capacity, adequate for all yield of any tree regardless of the length of apron extension assembly required, a further object of the invention is the provision of an apron extension assembly which omits a corresponding conveyor section.

In the absence of any additional conveyor section for such apron extension assembly, and as an additional object of the invention, means are provided for gravity delivery of crop from said apron extension assembly to the conveyor associated with an apron assembly in connection with which said apron extension assembly is employed.

The foregoing and other objects, features, and advantages of the present invention will become more apparent upon consideration of the following description and appended claims when considered in conjunction with the accompanying drawings wherein the same reference character or numeral refers to like or corresponding parts throughout the several views.

On the drawings:

FIG. 1 is a perspective view of a fruit catcher embodying the present invention, parts being broken away for the purpose of illustration.

FIG. 2 is an elevational view of a framework extension comprising said invention viewed from the carrier and looking outwardly, parts being omitted and parts shown in phantom for the purpose of illustration.

FIG. 3 is an elevational view looking from the left side of FIG. 2 toward the left end of said framework extension.

Referring now more particularly to FIG. 1, therein is seen a carrier 11 which is shown in the form of a self-powered farm tractor. A boom 13 is reciprocatively supported on said carrier by means of a stand 15. A mount member 17 is arranged on the stand 15 for elevational movement of said boom. An opposably-jawed yoke 19 is arranged on the outer end of the boom for grippable engagement with the limb of a fruit-bearing tree. A shaker assembly 21, which may be of conventional construction, is arranged on the opposite or inner end of said boom for reciprocation of said yoke to dislodge fruit.

An extensible catcher apron assembly 23 comprising a collapsible framework 24 and web means 29, which may be of conventional construction, is arranged for extension from one side of carrier 11. Framework 24 is arranged so that as it extends outwardly it slopes downwardly. Said framework comprises an outer frame member which in the present embodiment serves as a housing 25 for an endless conveyor 27. When in fully extended condition, as in FIG. 1, housing 25 will be ground supported. Details of construction by reason of which framework 24 is collapsible are not limiting on the present invention, and, accordingly, further description is omitted.

Web means 29 herein are shown as comprising webs A, B, and C. They are supported on the framework 24 in a common plane in overlapping association. An outer end portion 39 of said web means is anchored by any convenient means to the carrier side 31 of housing 25, whereby said webs A, B, and C are co-extensible with said housing. The width of said web means and the length of said housing are substantially equal to each other. Thereby, fruit 41 caught in said web means will be gravity-fed toward said conveyor.

Conveyor 27 comprises a sprocket 33 which is suitably arranged by means which may be conventional for motivation from carrier power means (not shown). An endless conveyor chain comprising flights 35, only some of which have been numbered in FIG. 1, is arranged on housing 25 in a manner such that a work course 37 of said flight rides atop the outer end portion 39 of said web means to sweep fruit 41 to one side portion 43 of said web means.

A first elevator 45 has an outer lower end portion disposed in receiving association with a delivery end portion of the conveyor 27. By means which may be conventional, said first elevator is arranged adjacent the side portion 43 of web means 29 and extends normally from the housing 25 toward carrier 11 for corresponding translocation of harvested fruit upwardly in the direction of arrow 47. A second elevator 49 has its lower end portion (not seen) in receiving alignment with the inner or delivery end portion (not seen) of first elevator 45. Elevator 49 is arranged at the back end of carrier 11 and projects upwardly. It is adapted to convey fruit in the direction of arrow 51 for deposit in an integral delivery chute 53.

A fruit catching web D is disposed along side portion 43 of web A. Web D is shown herein conditioned to partially cover an upper opening in the housing of first elevator 45. Web D is rollably mounted on a spring biased cylinder 55 about which the inner end of said last web section is secured for retractable extension in window shade fashion. Said cylinder is mounted for rotation in a suitable retainer 57. Said retainer is held on an extension (not shown) of framework 24 to hold the inner end of web D adjacent the carrier. The inner ends of webs A, B, and C are secured, like section D, on cylinders (not shown) which are rollably held in fixed position on an inner end portion of framework 24.

In the present embodiment, construction of framework 24 and arrangement of the webs are such that a gap 59 develops between carrier 11 and the inner end portion of web means 29. To the end that no harvested fruit falls in said gap, a shield 60 in the form of an elongated rectangular screen is angularly disposed from framework 24 in a direction which slopes downwardly as it extends outwardly to cover gap 59 and deflect harvested fruit onto said web means.

A flap assembly 61 comprising a plurality of adjoining overlapping flap sections E, F, and G is adapted to cover housing 25. One plate of an elongated hinge 63, only a portion of which is shown in FIG. 2, is suitably secured longitudinally of the inner side of the housing 25. The inner end portion 65 (FIG. 1) of the flap assembly 61 is secured to the movable plate of said hinge 63. Thereby, said flap assembly can cover and uncover housing 25. The outer end portion 67 of the flap assembly, when conditioned to cover housing 25, extends outwardly beyond said housing, as in FIG. 1, and is adapted for engagement about a tree to be harvested.

A plurality of arcuate or bow-shaped spring fingers 71 project outwardly from hinge 63 to the movable plate on which they are secured. Said spring fingers are spaced longitudinally of housing 25 in supportive association with flap assembly 61. While this last supportive relationship is not specifically illustrated, a like association is shown in FIG. 3 the details of which will be considered in ensuing description.

An elongated frame-supported attitude control arm 69 extends longitudinally of housing 25 and transversely of spring fingers 71 for adjusting the aspect of flap assembly 61. Said attitude control arm engages beneath spring fingers 71. The arms 69 is arranged for arcuate up and down movement to adjust the inclination of the flap assembly 61, whereby fruit falling thereon will be directed toward the inner end portion 39 of web means 29 for fruit removal by conveyor flights 35.

Along each side of fruit catcher apron assembly 23, a fruit catching extension assembly 75 may be added to increase fruit-catching expanse. Inasmuch as each fruit catching extension assembly 75 is substantially the same as the other thereof, details of construction of only one will be set forth in the ensuing description.

An extension assembly 75 comprises an inner framework extension 77 (FIG. 1) which herein is shown as a round tube projected outwardly from framework 24 longitudinally of the axis of carrier 11. Framework extension 77 carries an angle bar 78 having bracket means 79 for rotationally supporting a pair of spring biased cylinders 81 (only one of which is seen in FIG. 1) at various levels. A pair of adjacent webs 83 and 85 are connected to said cylinders for rolling in window shade fashion. Said last web sections are disposed in overlapping relationship in a plane along one side of web means 29. If desired, inner framework extension 77 may be slightly inclined upwardly as it extends outwardly to slope the upper and inner end of extension 75 for gravity fruit delivery toward web means 29.

An outer frame extension generally designated 87 is provided for anchoring the outer ends of apron webs 83 and 85. The details of construction of said outer frame extension are seen in FIGS. 2 and 3.

To mount said last-mentioned frame extension, a pair of bosses 89 which herein are shown as pipe sections have their inner ends rigidly secured by any suitable means to housing 25. The bosses 89 are arranged so that when housing 25 is in its normal operating position, that is, resting on a ground surface, said bosses are spaced apart transversely of and project from said housing 25 in a direction normal to their spacing. In terms of reference to FIG. 2 relative to which all subsequent directional designations will be made, a pair of vertical plates 91 and 93 are secured about bosses 89. Plates 91 and 93 are horizontally spaced apart and extend upwardly from bosses 89 to provide journalling support for a short shaft 95. The shaft 95 provides a horizontal axis extending transversely of the longitudinal axis of frame extension 87.

Outer frame extension 87 comprises a plurality (herein shown as two) of connected-together elongated extension sections 97 and 99 which may be horizontally disposed and arranged in end-to-end relationship from one end of conveyor housing 25. Herein, section 99 is proximal said conveyor housing. Ear means 101 are carried by said last section for its journalled connection on shaft 95. By reason of the foregoing construction, outer frame extension 87 is rockable, for example, from the solid to the phantom line position shown in FIG. 2.

As illustrated in FIGS. 2 and 3, plate 91 is longer than plate 93. Rigidly secured to the lower end portion of plate 91 are inner end portions of a pair of ears 103 which are disposed below and between the bosses 89 in spaced apart relationship. An inner end portion of an hydraulic cylinder 105 is pivotally arranged between ears 103 by means of a pin 107 projected through said last ears and said cylinder. Hydraulic cylinder 105 comprises an hydraulic assembly from which there projects outwardly a piston rod 109, the latter having an outer end portion defined by a clevis 111. Clevis 111 is connected by a pivot 113 to extension section 99 in a manner to be more fully set forth in ensuing description. By reason of the connection of frame extension 87 to conveyor housing 25 at pivots 95 and 113, torque supplied to said housing for extension and retraction will be transmitted to said frame extension which will be motivated for extension and retraction with said housing 25.

Each of extension sections 97 and 99 is associated with a corresponding of the webs 83 and 85. To anchor the outer ends of said webs, suitable anchoring lugs or hooks 102 (FIG. 2) are provided on said extension sections 97 and 99. Accordingly, webs 83 and 85 will be extended and retracted with web means 29.

Each of the extension sections 97 and 99 is of general rectangular configuration, and comprises a pair of outer upper and lower inner horizontal angle bars 115 and 117, respectively, rigidly secured together to form a channel-shaped outer rail 119 (FIG. 3). Each of said extension sections 97 and 99 also comprises a pair of inner upper and lower horizontal angle bars 121 and 123, respectively, secured together to form a channel-shaped inner rail 125. Rails 119 and 125 of each of extension sections 97 and 99 are disposed in spaced apart relationship with the troughs defined by such last rails in facing association.

A cylinder connector assembly 127 comprising an angle arm 129 is supportingly arranged on angle bars 117 and 123 transversely of extension section 99. Angle arm 129 has an upwardly extending flange 131. A threaded adjusting pin 133 projects through flange 131 longitudinally of rails 119 and 125. A pair of opposed lock nuts 135 are threadingly mounted on pin 133 on opposite sides of said flange for pin adjustment. A transversely extending plate 137 is secured from angle bars 115 and 121 of extension section 99. Plate 137 has a pair of spaced apart depending ears 139 which extend between arms of clevis 111. Pin 133 has a head (not shown) which is disposed between ears 139. Pivot 113 extends through said clevis 111, ears 139, and the unseen head of pin 133 to adjustably connect cylinder 105 to extension section 99.

At all ends of extension sections 97 and 99 which are disposed or adapted for disposition adjacent an adjoining extension section, there is provided an upper cross frame arm 145 and a lower cross frame arm 147. Each of said cross frame arms may be an angle bar disposed transversely of associated rails 119 and 125 to which opposite ends of said last mentioned cross frame arms are rigidly secured, by welding, for example. Corresponding legs 143 of each pair of said cross frame arms which are disposed at a common side of extension sections 97 and 99, respectively, project upwardly and downwardly from associated channel-shaped rails 119 and 125. Adjoining of said cross frame arms are disposed in what might be referred to as back-to-back relationship, as illustrated in FIG. 2. A pair of upper and lower threaded inner tie pins 157 and a pair of upper and lower threaded outer tie pins 159 are projected through apertures 149 (FIG. 3) of adjoining frame members. The latter are secured by an opposed lock nut assembly 161 threadingly engaged on each of said tie pins. By reason of the foregoing construction, extension sections 97 and 99 are rigidly secured together.

Lower frame arm 147 mounted on the free end portion 163 of extension section 97 does not require tie pins 157 and 159 inasmuch as there is no adjoining extension section to connect to said last mentioned frame arm. However, frame arm 145 which is mounted on end portion 163 is provided with pins 157 and 159 and opposed lock nut assemblies 161 for a purpose which will become apparent from ensuing description.

An outer flap attitude control member 165 and an inner flap attitude control member 167 comprise an outward extension 155 of attitude control arm 69 (FIGS. 1 and 2). An elongated flexible flap 169 extends outwardly from web sections 83 and 85 and is adapted to extend over attitude control arm extension 155 and frame extension 87, as illustrated in FIG. 3. A plurality of spring fingers 71 which are spaced apart longitudinally of frame extension 87 are arranged for support of flap 169. The spring fingers associated with frame extension 87 project outwardly from the rockable plate of a hinge 171 (FIG. 2) to which the inner ends of said spring fingers are secured. A pivot pin 173 of hinge 171 is evident in FIG. 3. Another plate of said hinge is rigidly secured to the top of each of the extension sections 97 and 99. The spring fingers extend transversely of attitude control members 165 and 167 by which said spring fingers are supportively engaged medially their inner and outer ends.

As illustrated in FIG. 2, in the present embodiment attitude arm extension 155 comprises a pipe assembly. From the opposite ends of attitude control member 167 are mounted a pair of eyelet members 174. An eyelet member 175 is also mounted from the outer end of attitude control arm 69. The last mentioned eyelet member together with the thereto proximate eyelet member 174 are interlockably arranged, each of said last mentioned eyelet members extending through the eye of the other. The interlocking engagement of the eyelets is such that attitude control member 167 can be rocked in a vertical plane to change its angular aspect relative attitude control arm 69. The opposite eyelet member 174 interlockably engages an eyelet member 177 carried from the inner end of attitude control member 165.

Outer attitude control member 167 includes a medial pipe 179 and a pair of smaller end pipe sections 181 arranged on opposite sides of said pipe. A wedge or tubular connector 183 which is press fit into each pipe section 181 and an adjoining end of pipe 179 serves to connect together the components of the attitude control member 165.

The foregoing construction is adapted for further extension than that which is illustrated in the drawings. To that end, an additional attitude control member in the form of a pipe (not shown) like pipe 179 may be secured in the left end (in terms of FIG. 2) of the pipe section 181 by employment of an additional connector 183. Moreover, an additional extension section (not shown) such as section 97 may be added by connection to the right legs 143 of such additional section and to the left legs of extension section 97 in an apparent manner.

The attitude control members 165 and 167 are supported by a plurality of spaced apart upwardly and outwardly extending angularly disposed support arms 185 (FIG. 3). The outer ends of support arms 185 are recessed on a radius corresponding to the radius of curvature of pipe sections 181 which engage in the recesses of said support arms. The inner end of each of said support arms is pivotally engaged on a threaded pin 159 (FIG. 2), retention being achieved through the medium of a pair of opposed lock nuts 187 threadingly engaged on opposite ends of a corresponding pin 159. A clevis 191 receives between its arms the upper and outer end portion of each of said support arms. A pivot 193 extends through the arms of each clevis and an associated support arm 185 to provide therefor a rocking connection. An adjusting rod 195 has an outer threaded portion 197 which threadingly engages in the inner end of each clevis 191 for adjustment, whereby set or base attitude of arms 185 may be correspondingly determined, as illustrated in FIG. 3. The inner end of each rod 195 comprises an eyelet 198 (FIG. 2) which engages about a corresponding pin 157, said eyelet being rockably arranged between an associated nut assembly 161 and an additional nut 199. As a result of the foregoing construction, the aspect of flap 169 is adjustable about hinge pin 173 in response to adjustment of attitude control members 165 and 167 about an axis defined by pins 159. Thereby, fruit can be directed from flap 169 toward webs 83 and 85.

Of significance regarding the present invention is the adjustability of the angular aspect of the outer frame extension 87 and attitude arm extension 155 about shaft 95. The latter is controlled through the hydraulic cylinder 105 which upon extension may rock the entire frame extension 87 together with attitude arm extension 155 from the solid to the phantom line position of FIG. 2. As a result, the attitude of flap 169 and webs 83 and 85 will cause gravity feeding of fruit toward catcher apron assembly 23. Thereby, fruit falling on webs 83 and 85 and flap 169 will be removed from the fruit catcher through the conveyor and elevator assembly associated with apron assembly 23 and a separate conveyor for the extension assembly 75 can be omitted.

As many substitutions or changes could be made in the above described construction and as many apparently widely different embodiments of the invention could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a fruit catcher and the like having an apron assembly supported for disposition in fruit catching attitude about a tree and having upstream and downstream end portions associated for fruit feeding from the former to the latter thereof, conveyor means arranged in fruit receiving association with said downstream end portion for removal of fruit from said apron assembly, apron extension means disposed transversely of said upstream and downstream end portions laterally adjacent and in fruit delivery association with said apron assembly, and in which said apron assembly comprises tree distal and tree proximate frame portions disposed in gravity feed association and defining said upstream and downstream end portions, web means having upper and lower end portions connected to said tree distal and tree proximate frame portions for gravity fruit feed toward said conveyor, a deflector assembly projecting outwardly from said lower end portion for tree engagement, an attitude control arm in supportive association with said deflector assembly to position the deflector assembly for gravity feed toward said conveyor, connection means arranged on said tree proximate frame portion for securance of said apron extension means to said apron assembly, and in which said apron extension means comprises a web extension assembly having opposite inner and adjustable end portions, an inner frame extension arranged relative to said tree distal frame portion to provide a fixed support for the inner end portion of said web extension assembly, an outer frame extension arranged from said connection means to provide a rockable securance for the adjustable end portion of said web extension assembly to alter the aspect of said web extension assembly for gravity feed toward said web means, supplemental deflector means projecting outwardly from said web assembly, an attitude control arm extension adjustably secured to said outer frame extension for rocking therewith in variable supportive association with said supplemental deflector means, and tilt means for selectively changing the angular attitude of said outer frame extension to twist said web extension and rock said supplemental deflector means in fixed relation to said attitude control arm extension for delivery toward said web means.

2. A fruit catcher as defined in claim 1 in which the outer frame extension comprises laterally aligned first and second segments rigidly secured to each other, said first segment rockably connected at said downstream end portion, said second segment conditioned for securance thereto of a like segment, said web assembly comprising a plurality of webs having treeward end portions respectively connected to said first and second segments.

3. A fruit catcher as defined in claim 1 in which said tilt means comprises an hydraulic assembly having an end portion anchored at a fixed station relative said downstream end portion and an extensible part connected to said first segment for attitude control of said web assembly.

References Cited

UNITED STATES PATENTS

| | | | |
|---|---|---|---|
| 1,293,460 | 2/1919 | Johnson | 56—329 |
| 2,602,279 | 7/1952 | Leighton | 56—329 |
| 2,913,866 | 11/1959 | Curtis | 56—329 |
| 3,347,032 | 10/1967 | Pool et al. | 56—329 |

LOUIS G. MANCENE, Primary Examiner

P. A. RAZZANO, Assistant Examiner